UNITED STATES PATENT OFFICE.

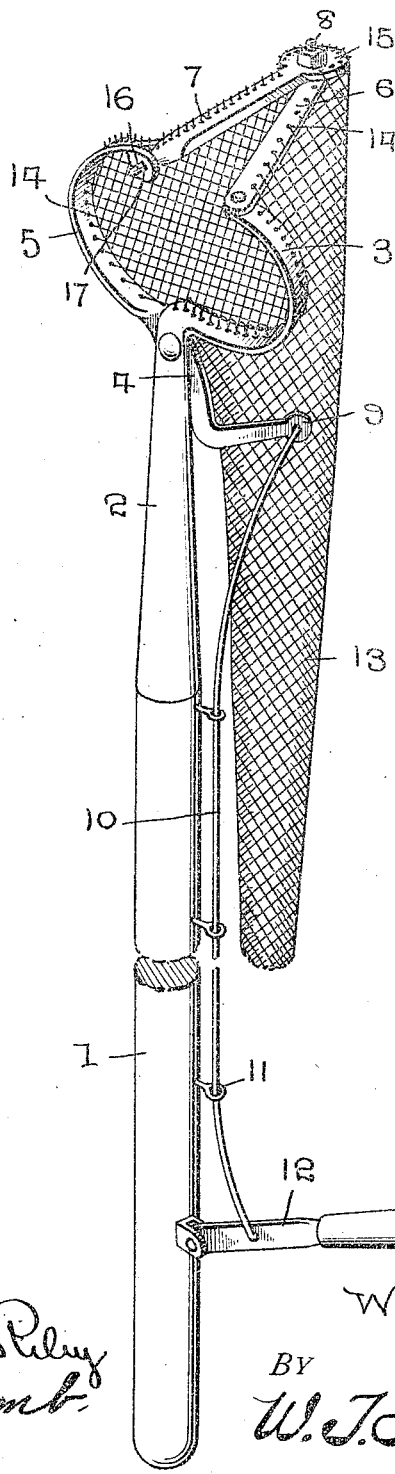

WILLIAM Y. RICHARDSON AND EMIL TIGERSTRAND, OF SALEM, OREGON.

FRUIT-GATHERER.

999,261.         Specification of Letters Patent.    Patented Aug. 1, 1911.

Application filed November 8, 1910. Serial No. 591,253.

*To all whom it may concern:*

Be it known that we, WILLIAM Y. RICHARDSON and EMIL TIGERSTRAND, citizens of the United States, residing at Salem, in the county of Marion and State of Oregon, have invented certain new and useful Improvements in Fruit-Gatherers; and we do hereby declare the following to be a full, clear, and exact description of the invention, such as will enable others skilled in the art to which it appertains to make and use the same.

Our invention relates to new and useful improvements in fruit gatherers and is more particularly adapted for removing apples, pears and similar fruits from the tree.

Our object is to provide an elongated handle and place thereon shears for severing the stems of the fruit.

A further object is to provide means for operating the shears, and, a further object is to provide a net through which the fruit may descend from a height without bruising or otherwise injuring the fruit.

Other objects and advantages will be hereinafter set forth and pointed out in the specification.

In the accompanying drawing the figure is a perspective view of the device in its operative position.

Referring to the drawing, 1 indicates a staff or handle, which is preferably made of considerable length so that it will reach into the tops of the trees. The upper end of the staff has attached thereto a socket 2, which terminates in a semicircular arm 3 and pivoted to said socket adjacent its connection with the arm is a shank 4 of a movable arm 5. Attached to the free ends of the arms 3 and 5 are blades 6 and 7, respectively, which blades extend at right angles to the axial trend of the staff and are pivoted together in any suitable manner, as by means of a bolt or rivet 8, the meeting edges of said blades being preferably sharpened so as to sever an object when the blades are moved together.

The shank 4 between its pivotal connection with the socket and its free end is bent at substantially right angles to form a lever 9 and to said lever is attached a rod 10, said rod passing through eyes 11 on the staff and into engagement with a handle 12 adjacent the lower end of the staff. The inner end of the handle is pivotally connected to the staff so that when a downward pull is given the handle the lever and shank are rocked and the arm 5 moved toward the fixed arm 3, thereby moving the blade 7 over the blade 6 and giving a shearing action whereby the stem of the fruit will be severed.

If the device is used for gathering apples the curved arms are passed on opposite sides of the apple, thus disposing the stem of the apple between the two blades, when by operating the handle as previously described, the stem of the apple will be severed. To prevent bruising of the apple as it descends after its stem has been severed, a tubular net 13 is provided one end of which is stretched around the arms 3 and 5 and along the blades 6 and 7, the strands of the net being secured through openings 14 in the arms and blades, the pivoted end 15 of the blade 7 being formed into a disk so that the strands of the net will not be cut when the blades are swung together. By attaching the net in this manner the fruit will descend into the net and as the net is narrowed toward its free end, the descent of the fruit will be so retarded as not to injure the fruit when it reaches the lower end of the net. As the end of the arm 5 moves in a vertical plane toward the arm 3 and as the end of the blade 7 engaging said arm moves in the arc of a circle when operated by said arm, it is necessary to provide a sliding connection between the arm 5 and end of blade 7, which is accomplished by twisting the free end of the arm 5 until the flat face thereof is presented to the end of the blade 7. The end of the blade 7 is formed into a pintle 16, which pintle is introduced through an opening 17 in the portion of the arm 5 presenting a flat face to the blade and it will be readily seen that as the arm 5 is swung back and forth the pintle will slide in the opening and thus compensate for the difference in movement of the pivoted arm and the blade coöperating therewith. It will further be seen that this device can be very cheaply constructed and by curving the arms, as shown, they can be readily and easily introduced over the fruit preparatory to cutting the stems thereof, and, it will likewise be seen that when the fruit is passed between the arms it will be so held as to render the shearing action of the blades positive.

What we claim is:

1. In a fruit gatherer the combination with a staff and a fixed curved arm thereon, a similar arm pivoted to the fixed arm, said pivoted arm terminating at one end in a lever, a pair of blades pivotally secured together at one end and having their opposite ends secured respectively to the free ends of said arms and means to operate said lever to move the pivoted arm toward the fixed arm and one of the blades over the other blade.

2. In a fruit gatherer, a staff, a socket engaging one end of the staff, said socket terminating in a semicircular arm, a similar arm pivoted to the socket, a lever integral with one end of the pivoted arm, means to operate said lever to move the pivoted arm toward the fixed arm, a pair of coöperating blades pivotally secured together at one end the opposite end of one of the blades being secured to the fixed arm and the end of the opposite blade slidably connected to the end of the pivoted arm.

3. In a fruit gatherer the combination with a staff having a socket at one end, said socket terminating in a fixed arm, a similar arm pivoted to the socket and coöperating with the fixed arm, means to swing the pivoted arm toward the fixed arm, a pair of blades pivoted together at one end and having their opposite ends attached respectively to the arms and a tubular net the edges of which are secured to the arms and blades.

In testimony whereof we have signed our names to this specification in the presence of two subscribing witnesses.

WILLIAM Y. RICHARDSON.
EMIL TIGERSTRAND.

Witnesses:
EMILY NEROD,
C. M. INMAN.